(12) United States Patent
McCarrol

(10) Patent No.: US 6,269,000 B1
(45) Date of Patent: Jul. 31, 2001

(54) POWER ELECTRICAL ENCLOSURE (75) Inventor: Alec McCarrol, Bramalea (CA)

(73) Assignee: Husky Injection Molding Systems, Ltd., Bolton (CA)

( * ) Notice: Subject to any disclaimer, the term of this patent is extended or adjusted under 35 U.S.C. 154(b) by 0 days.

(21) Appl. No.: 09/462,079

(22) PCT Filed: Jun. 18, 1998

(86) PCT No.: PCT/CA98/00599

§ 371 Date: Jan. 7, 2000

§ 102(e) Date: Jan. 7, 2000

(87) PCT Pub. No.: WO99/03179

PCT Pub. Date: Jan. 21, 1999

(30) Foreign Application Priority Data

Jul. 9, 1997 (CA) .................................................. 2210122

(51) Int. Cl.[7] .................................................. H05K 7/20
(52) U.S. Cl. .......................................... 361/695; 454/184
(58) Field of Search ..................... 165/121–126, 165/80.3, 185; 454/184; 361/676–678, 690, 694, 695, 704, 717–719, 796, 724–727; 174/59

(56) References Cited

U.S. PATENT DOCUMENTS

| | | | |
|---|---|---|---|
| 2,885,600 | * | 5/1959 | Wiseman . |
| 3,949,277 | * | 4/1976 | Yosset . |
| 4,639,834 | * | 1/1987 | Mayer . |
| 5,079,429 | * | 1/1992 | Tanaka . |
| 5,105,336 | * | 4/1992 | Jacoby . |
| 5,132,874 | * | 7/1992 | Chandler . |
| 5,237,484 | * | 8/1993 | Ferchau . |
| 5,239,128 | * | 8/1993 | Golden . |
| 5,289,363 | * | 2/1994 | Ferchau . |
| 5,326,934 | * | 7/1994 | Lemaster . |
| 5,467,250 | * | 11/1995 | Howard . |
| 5,504,657 | * | 4/1996 | Stocco . |
| 5,592,366 | * | 1/1997 | Goldman . |
| 5,689,604 | * | 11/1997 | Janos . |

FOREIGN PATENT DOCUMENTS

4035082  *  5/1992  (DE) .

* cited by examiner

Primary Examiner—Gerald Tolin
(74) Attorney, Agent, or Firm—Eric Spencer (57) ABSTRACT

A novel enclosure for power electrical components is presented. A generally parallelepiped enclosure has an access cover therefore and a substantially planar plate slidably inserted therein, with the plate mounting a heat generating power electrical component thereon. Top and bottom cable raceways are also provided in the enclosure.

7 Claims, 6 Drawing Sheets

POWER ELECTRICAL ENCLOSURE

FIELD OF THE INVENTION

The present invention relates to an enclosure for electrical devices and connections. More specifically, the present invention relates to an enclosure for power electrical devices and connections, which are arranged in a modular manner on removable assemblies.

BACKGROUND OF THE INVENTION

Electrical enclosures and modular assemblies for use therein are known. Such enclosures range from simple closed volumes in which connections can be made to more advanced enclosures which can include backplanes to provide plug-in type connections to modular components active cooling components and/or signal distribution systems. Modular assemblies are also common and include units in programmable logic controllers (PLC's). I/O type cards, etc. An example of a more complex enclosure for use in the personal computer industry includes plug in modules active cooling and a signal distribution system and is shown in U.S. Pat. No. 5,289,363 to Ferchau, et al.

While the more complex enclosures are common for low power and/or signal-type connections electronics and electrical components such systems are less common for power electrical devices and connections. A relatively simple portable power distribution enclosure is shown in U.S. Pat. No. 5,070,429 to Skirpan. An example of a more complex power electrical enclosure is discussed in U.S. Pat. No. 3,949,277 to Yosset. which shows a power distribution cabinet which includes busses and frames to receive modular unfunctional power components.

However, none of the enclosures of which the present inventor is aware provide a desired set of features for use with power electrical components and connections. Specifically, power electrical components, such as polyphase 460V or 575V components or the like, are generally quite large relative to electronic components and are connected by large gauge cabling which electrical codes require to be routed with defined minimum radius curves. This is space consuming within an enclosure and the routing process is typically quite labour intensive. Also, unlike electronic components, power electrical components can be subject to and/or develop strong magnetic fields and the components must be mounted in a mechanically sound manner to prevent undesired movement of the components.

Also, many power electrical components generate large amounts of waste heat, which must be transferred out of the enclosure. However, such enclosures are often located in "dirty environments" wherein air which is circulated into and out of the enclosure to cool components therein must be filtered to prevent ingress of undesired materials and these filters require periodic maintenance or replacement to prevent component failure and/or fires. Also, unlike electronic components, power electrical components and connections pose a safety hazard to users and/or service technicians unless unintentional contact is prevented by proper shields and/or insulation. Finally, enclosures for power electrical components and connections are generally quite large, as most commonly the components are mounted to the walls of the enclosure, as is the cabling, requiring large amounts of wall space but making inefficient use of the volume within the enclosure.

More specifically, for modular injection molding machines manufactured by the assignee of the present invention, major functional systems such as the injection unit mold clamp, hydraulics or electric motors, controls and/or robotic systems are available as preengineered modules of different capacities and/or sizes. These preengineered modules are assembled as necessary to meet a customer's specifications. Accordingly, the specific power electric and power electronics requirements of a particular configuration are often not known until the machine is assembled to meet a specific customer order. The power and electrical subsystems are custom designed and assembled, in a labour intensive, time consuming and costly fashion, for each new molding machine. As a result, if, for example, a component of the power system fails during testing of the machine, diagnosis of the problem may require the complete removal of the power enclosure cabinet. This can result in expensive delays and shutdowns of the main machinery, and can greatly increase the cost of developing and testing new machines.

SUMMARY OF THE INVENTION

It is an object of the present invention to provide a novel power electrical enclosure which obviates or mitigates at least one of the disadvantages of the prior art. It is a further object of the present invention to provide a novel injection molding machine with a power electrical enclosure.

According to a first aspect of the present invention, there is provided an enclosure for power electrical components and connections, comprising:

a generally parallelepiped enclosure having a front face, a back face, a top and a bottom;

at least one cover on said enclosure to allow access to a volume defined therein:

at least one substantially planar plate insertable into said enclosure when said cover is open, said plate extending from said front face to said back face and having a surface for the mounting of at least one power electrical component;

a cable raceway adjacent each of said top and bottom, each said cable raceway arranged to hold one of a set of power cables and a set of control and signal cables; and     a portion of said enclosure adjacent said at least one substantially planar plate having an exposed portion of a wall of said enclosure on which electrical components can be mounted.

According to another aspect of the present invention, there is provided an enclosure for power electrical components and connections, comprising:

a generally parallelepiped enclosure having a front face, a back face, a top and a bottom;

at least one cover on said enclosure to allow access to a volume defined therein;

at least one substantially planar plate insertable into said enclosure when said cover is open, said plate extending from said front face to said back face and having a surface for the mounting of at least one power electrical component;

a cable raceway adjacent one of said top and bottom, said cable raceway arranged to hold a set of set of control and signal cables; and     a portion of said enclosure adjacent said at least one substantially planar plate having an exposed portion of a wall of said enclosure on which electrical components can be mounted.

According to another aspect of the present invention, there is provided an enclosure for power electrical components and connections, comprising:

a generally parallelepiped enclosure having a front face, a back face, a top and a bottom;

at least one cover on said enclosure to allow access to a volume defined therein;

a cable raceway adjacent one of said top and bottom, said cable raceway arranged to hold a set of control and signal cables and an air plenum adjacent the other of said top and bottom, said air plenum operating to circulate cooling air within said enclosure and having at least one set of power bus bars enclosed therein;

at least one substantially planar plate insertable into said enclosure when said cover is open, said plate extending from said front face to said back face and having a surface for the mounting of at least one power electrical component and a power connection means to receive power from said at least one set of power bus bars in said plenum and said cooling air circulated by said plenum being directed onto said mounting surface when said plate is inserted into said enclosure; and a portion of said enclosure adjacent said at least one substantially planar plate having an exposed portion of a wall of said enclosure on which electrical components can be mounted.

According to another aspect of the present invention, there is provided an injection molding machine comprising:

an injection unit;

a clamp unit for clamping molds;

a generally parallelepiped power electrical enclosure having a front face, a back face, a top and a bottom;

at least one cover on said enclosure to allow access to a volume defined therein;

at least one substantially planar plate insertable into said enclosure when said cover is open, said plate extending from said front face to said back face and having at least one power electrical component mounted to a surface thereof;

a cable raceway adjacent each of said top and bottom, each said cable raceway holding one of a set of power cables and a set of control and signal cables; and a portion of said enclosure adjacent said at least one substantially planar plate having an exposed portion of a wall of said enclosure on which electrical components are mounted.

The present invention provides a high density enclosure for mounting, interconnecting and providing power and control signals to a plurality of control modules such as PLCs, circuit breakers, and hydraulic pump motors. The enclosure accommodates modular, pre-engineered machine function components, which can be independently pre-assembled and interchanged in a short period of time.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
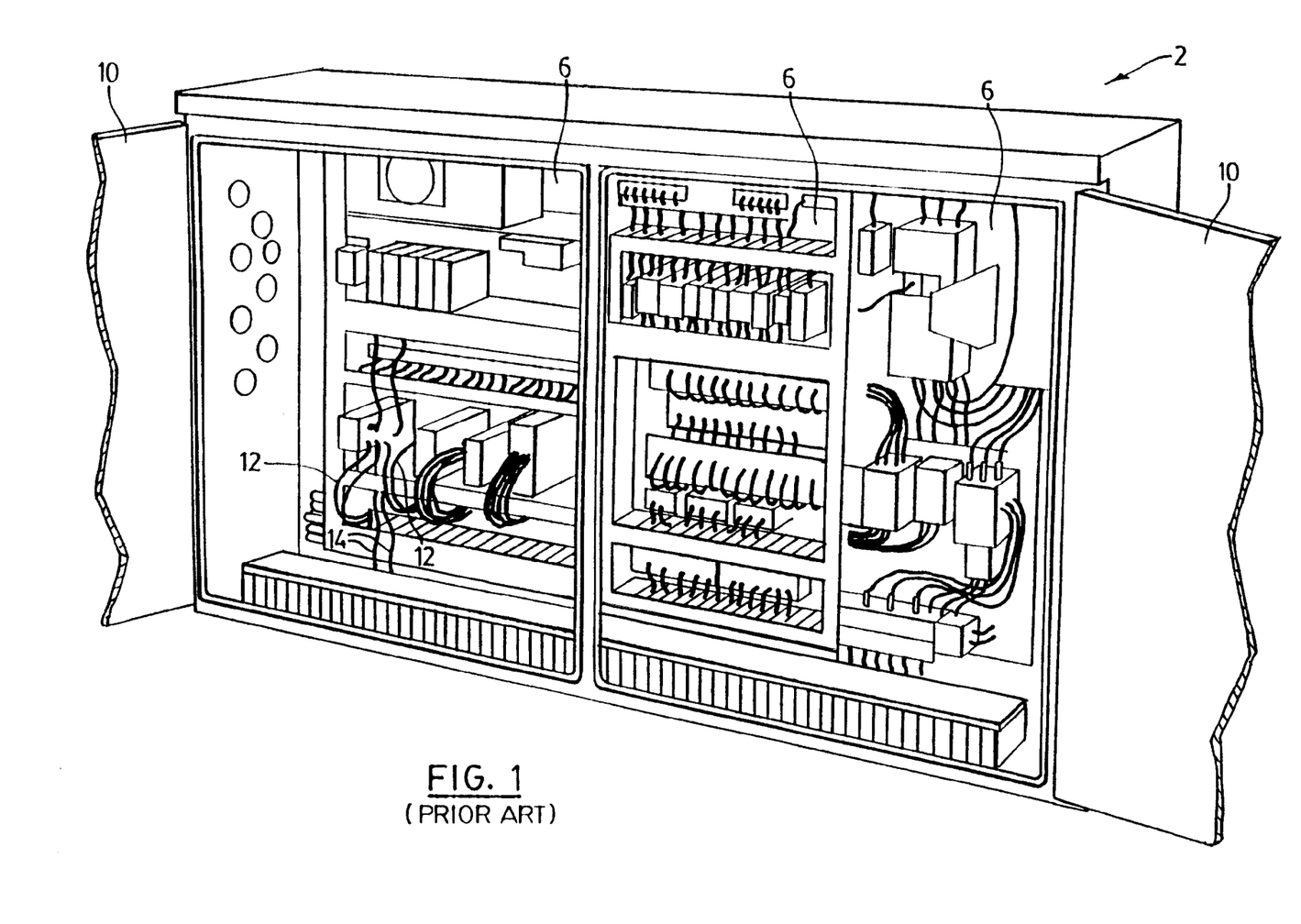
FIG. 1 shows a perspective view of the front and top of a prior art power electrical enclosure for use with hydraulic or electric molding machines.

FIG. 1 shows a prior art electrical enclosure, generally indicated at 2. The enclosure 2 is comprised of multiple machine functions laid out on a planar surface 6. Heating functions, for machine heats, can be integrated into doors 10 of enclosure 2 or installed on surface 6. Power wiring 12 and control wiring 14 are, commonly, in close proximity creating a potential safety hazard. Mold heating functions, which are required when a mold machine is coupled to a hot runner mold, must, generally, be installed in a separate enclosure because of the lack of physical space in standard enclosures. Additional cabling is thus required between the separate cabinets.

Heat dissipation can be a problem with the prior art enclosure, where solid state relays generate significant heat. To dissipate the heat, a larger enclosure and/or active cooling systems, such as high volume cooling fans, must normally be provided within enclosure 2.

A transformer, used to step down voltages for the controls and machine heats, is typically located outside the prior art enclosures. Generally, the transformer is of a "potted" type, meaning that it is surrounded in silica. The silica adds significantly to the weight of the transformer, and an overhead crane is generally needed to mount the transformer onto an injection molding machine.

A further disadvantage of prior art enclosures is that each component is custom designed for each new machine design. For example, the ultimate enclosure design can depend upon clamp tonnage, mold type and cavitation.

Figure 2:
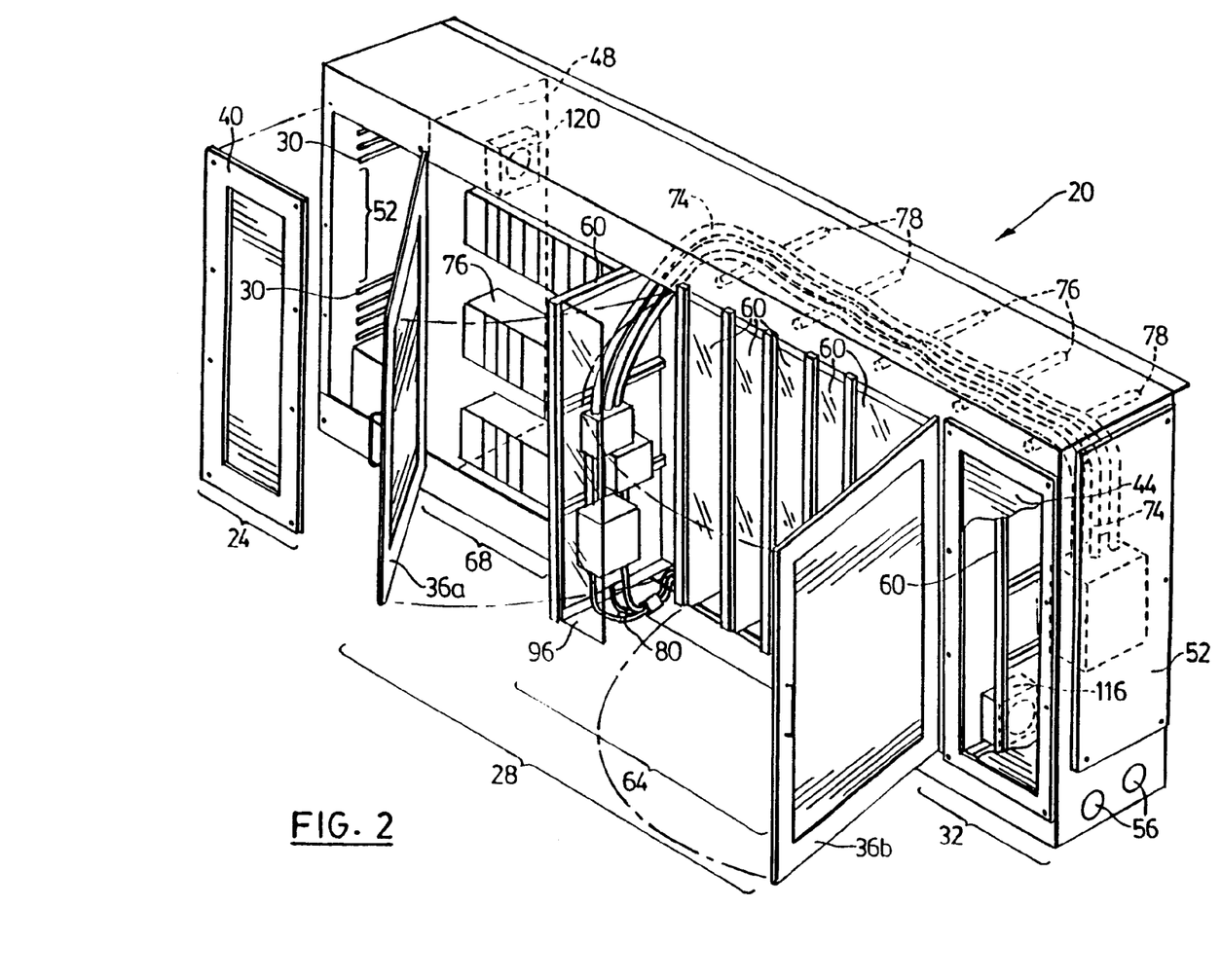
FIG. 2 shows a perspective view of the front and top of a power electrical enclosure in accordance with the present invention.
Figure 3:
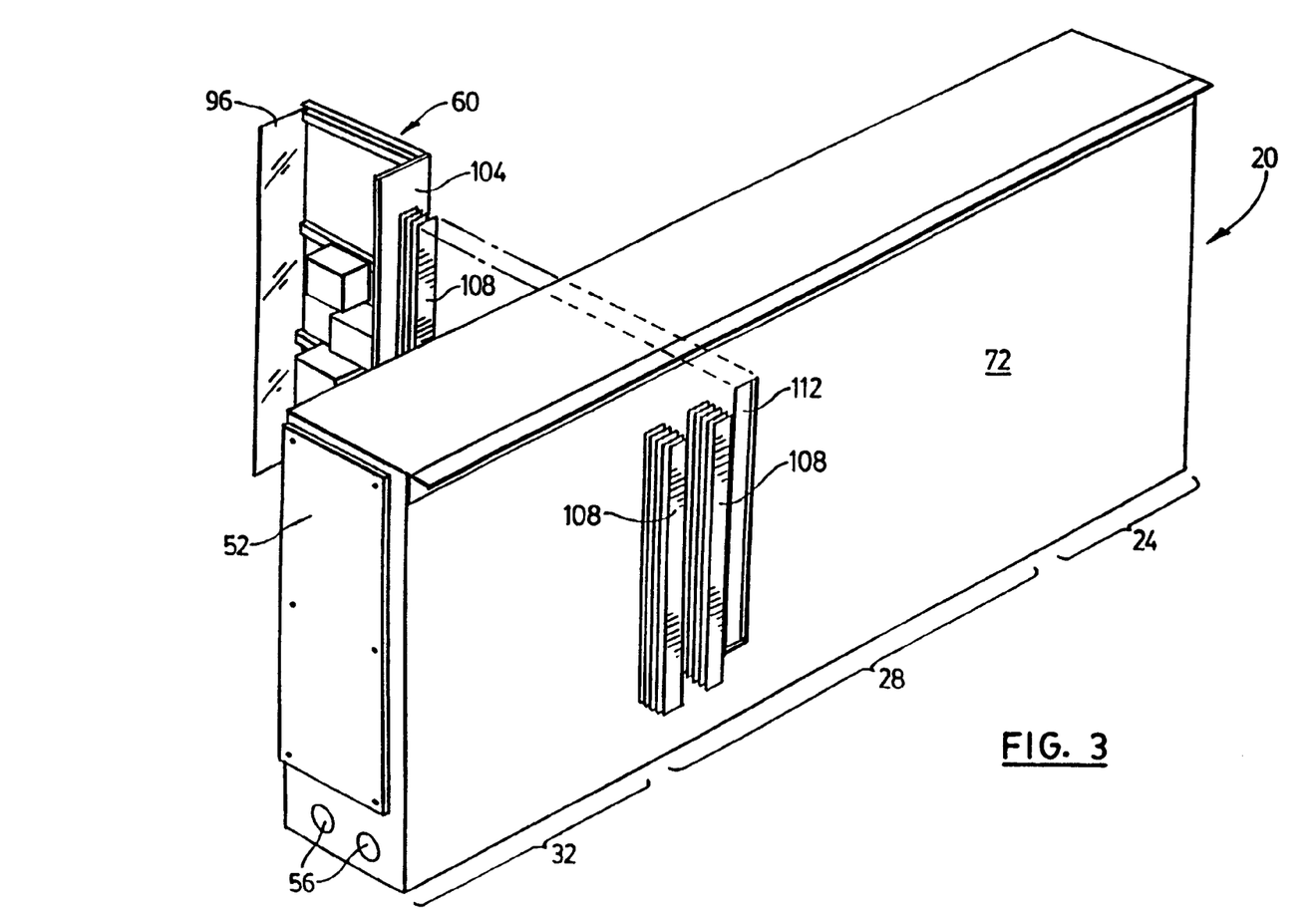
FIG. 3 shows a perspective view of the rear and top of the enclosure of FIG. 1.

An enclosure in accordance with an embodiment of the present invention is indicated generally at 20 in FIGS. 2 and 3. As shown, enclosure 20 is generally of a parallelepiped shape and is divided into three principal portions, first portion 24, central portion 28 and third portion 32. Central portion 28 includes a pair of covers, which in a presently preferred embodiment, are doors 36a, 36b, which can be opened and/or removed from central portion 28 to permit free access to the interior thereof.

First portion 24 and third portion 32 include access panels 40 and 44, respectively, which are removably fastened to enclosure 20 by bolts or any other suitable means. First portion 24 is separated from central portion 28 by an interior wall 48 which serves to prevent unintentional or unauthorized access to first portion 24 from within central portion 28. As illustrated, first portion 24 includes a series of ventilating apertures 30 to allow air from the exterior of enclosure 20 to circulate therein. It is contemplated that first portion 24 can contain un-potted or potted transformers, or other power components or the like to which regular access is not generally required, in a manner which inhibits unintentional or unauthorized access to the power components for safety reasons. Suitable cabling apertures (not shown) are provided through interior wall 48 such that connections can be made between the components within first area 24 and other portions of enclosure 20 as needed.

In addition to access panel 44, third portion 32 includes an end access panel 52 and one or more cable apertures 56.

Third portion 32 can include one or more assemblies, referred to herein as plates 60, as described in more detail below, upon which electrical components and/or connections are mounted. It is contemplated that third portion 32 will include a mains connection, to introduce an electrical power supply mains into enclosure 20 through cables run through apertures 56, electrical disconnects and/or main fuses.

Central portion 28 is sub-divided into two volumes 64 and 68. Volume 68 provides access to the interior surface of back wall 72 to allow components like PLC 76 to be mounted thereto. Volume 64 includes a series of upper and lower slide tracks (not shown)in which the upper 69 and lower 70 edges of plates 60 can be inserted allowing a service technician or user to slide plates 60 into or out of enclosure 20. In a present embodiment, the slide tracks are U-shaped, with the lower slide track containing a series of regularly spaced protrusions of semi-circular cross-section. These protrusions reduce the surface area that plates 60 contact on the lower slide track and allow easier sliding movement. The upper slide track consists of a slot through which the top edge of the plate 60 travels. Both upper and lower slide tracks incorporate a notch near the front end to allow plates 60 to hinge away from enclosure 20 when they are pulled out for inspection or maintenance. In the embodiment of FIGS. 2 and 3 central portion 28 includes six plates 60 and third portion 32 includes one plate 60.

As illustrated, in enclosure 20 power cables 74 are run along the top of the enclosure, over a series of supports 78 and signal, control or other low power cabling 80 is run along the bottom of enclosure 20. The separation of power cable 74 from cabling 80 reduces the possibility of electronic noise being introduced to cables 80. While in the illustrated embodiment power cables 74 are run along the top and cabling 80 along the bottom, as will be apparent to those of skill in the art this arrangement can be reversed, if desired.

Preferably, low power cabling is connected to plates 60 by suitable standard multi-pin connectors, such those manufactured by the AMP Company. In the embodiment of FIGS. 2 and 3 power cables 74 are directly connected to power electrical components on plates 60 as needed.

Figure 4:
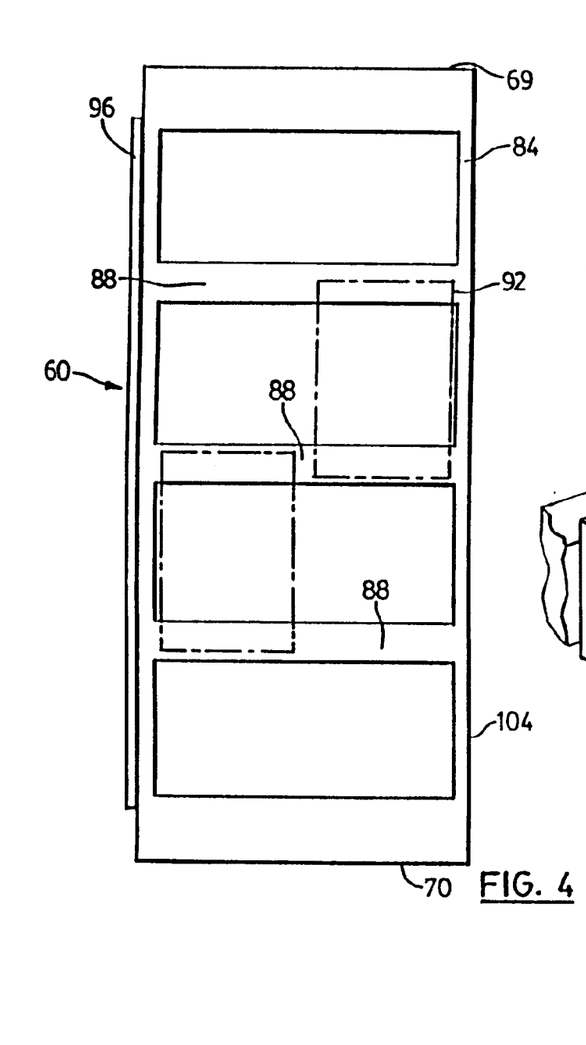
FIG. 4 shows an elevational view of a plate used with the enclosure of FIG. 1 with two electrical power components shown in ghosted line and mounted thereon.

As shown in FIG. 4, plates 60 are essentially a planar rectangular surface 84 with cross bars 88 to which power electrical components 92 (shown ghosted in the Figure) and/or connectors can be mounted by conventional means. In the present embodiment of the invention, surface 84 and cross bars 88 are formed from mild steel, although it is contemplated that other materials, such as high density plastic or other insulating materials can be employed if desired.

Each plate 60 also includes a shield 96 which extends horizontally outward from the plane of surface 84 to prevent unintentional contact with components 92 mounted on plate 60 when it is installed in enclosure 20. In a present embodiment of the invention. shield 96 is formed of transparent acrylic sheet material to allow a visual inspection of a plate 60 to be performed while plate 60 is installed within enclosure 20. Shield 96 can also have mounted thereon test points, indicators or other electronic devices which service or maintenance personnel may wish to access without removing plate 60 from enclosure 20.

Figure 5:
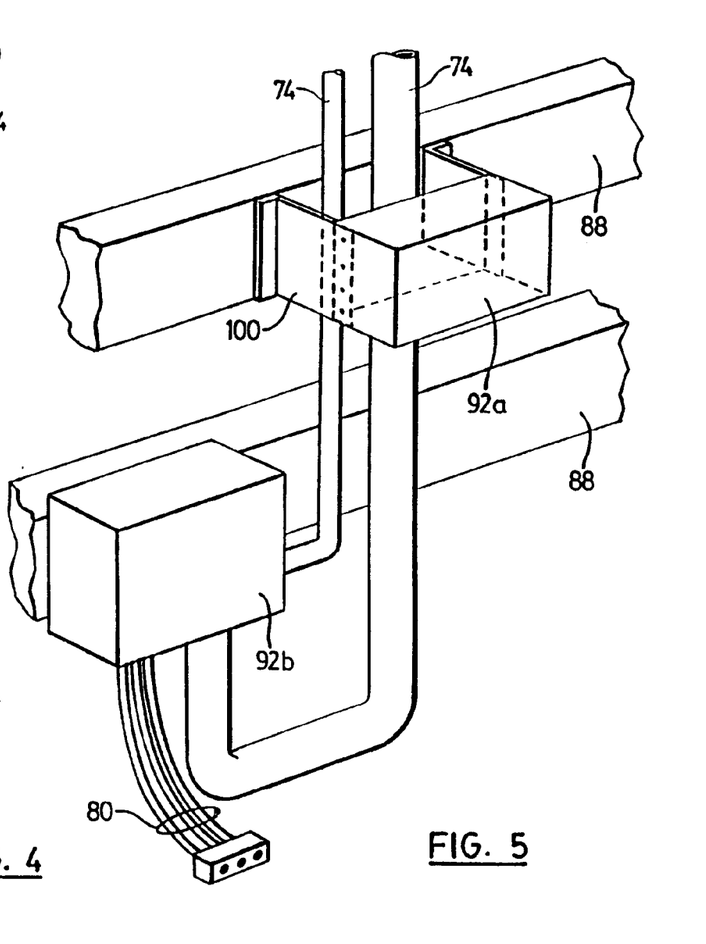
FIG. 5 shows an expanded view of the area of FIG. 1 within the circle labelled A.

To prevent unintentional contact between components and connections on different plates 60, all components and connections are located on a single side of each plate 60 As mentioned above, electrical power cabling is generally of large gauge and there are minimum radii defined in electrical codes for curves in routing such cables. In order to permit the connection of multiple power components on a single plate 60 and to make the necessary connections thereto without undue waste of volume within enclosure 20, electrical components 92 can be horizontally "staggered" to permit power cabling to be run between surface 84 and components 92 as desired. In FIG. 5, a conventional power electrical component 92a is shown mounted to extension plates 100 which are mounted in turn to cross bar 88. Power cables 74 can thus be routed between crossbar 88 and component 92a to be connected to component 92b.

As will be apparent, the arrangement of plates 60 within enclosure 20 makes efficient use of the volume within enclosure. Further, as components and/or connections are arranged in a relatively closely spaced, or "dense", manner within enclosure 20, the length of the cables and leads required to interconnect the components within enclosure 20 are often reduced. This can result in reduced manufacturing costs and reduced power losses due to shorter cable runs.

As mentioned above, power electrical components can generate significant amounts of heat that typically must be removed from within an enclosure. For example, solid state relays used to control heaters in injection molding machines can produce approximately one watt of waste heat for every ampere of electricity they switch. In the present invention, such components are mounted on plates 60 adjacent the edge 104 which is opposite the edge at which shield 96 is mounted, as best seen in FIG. 3. A heat sink 108 is provided on plate 60 and extends beyond the edge of plate 60 and the components which generate significant amounts of heat are thermally connected to heat sink 108 by any appropriate means. As shown in FIG. 2, rear wall 72 of enclosure 20 is provided with one or more slots 112 of complementary shape and size to heat sink 108 and which are positioned such that when a plate 60 with a heat sink 108 is inserted into enclosure 20, heat sink 108 extends through slot 112, filling slot 112 inhibiting ingress of foreign matter into enclosure 20 and preventing human contact with the contents of enclosure 20 through slot 112. With heat sink 108 being located outside enclosure 20, a potentially significant amount of waste heat is directly and passively radiated outside of enclosure 20, reducing the cooling requirements within enclosure 20.

While the above description has focused on the advantages of the present invention with respect to the use with power electrical components and connections, as will be apparent to those of skill in the art, enclosure 20 can, and often will also contain low power control electronics and/or signalling systems, etc. Such low power electronics can be mounted in volume 68 in a conventional manner or can be mounted onto a plate 60, either in addition to or instead of power electrical components.

In a present embodiment of the invention, the cooling of the interior of central portion 28 and third portion 32 is accomplished entirely by two pancake fans 116 and 120 which merely circulate the air within enclosure 20 to average any hot spots.

While it is contemplated that in some hotter climates and/or environments additional cooling means may be required, the present embodiment is advantageous in that it does not require the circulation of cooling air between the interior and exterior of enclosure 20. thus eliminating the requirement for filters, etc. which require maintenance and/ or servicing. In fact, when doors 36a and 36b and access panel 44 are properly closed, central portion 28 and third portion 32 are substantially airtight, inhibiting the ingress of dirt or other undesired substances.

As will be apparent to those of skill in the art, the use of plates 60, which are mounted in a front to back orientation in enclosure 20 allows efficient use of the volume within enclosure 20. For example, the configuration and equipment illustrated in FIGS. 2 and 3 when mounted in a conventional manner to the interior walls of an enclosure require an enclosure 30% larger than the size of enclosure 20.

It is contemplated that, in some circumstances, first portion 24 or third portion 32 can be omitted from enclosure 20. For example, if a potted transformer is employed with enclosure 20, it can be mounted to the exterior of enclosure 20 and its cabling led into the interior of enclosure 20 via one or more suitable cable apertures, thus allowing first portion 24 to be omitted. Similarly, if the mains disconnects and other main power connection equipment is located separately and mains power is supplied to enclosure 20 by one or more mains cables, third portion 32 can be omitted and apertures 56 provided elsewhere on enclosure 20 to receive the mains cables.

It is also contemplated that, for locations with reduced access space, sliding type doors can be employed instead of doors 36a and 36b which otherwise require space through which to swing.

Figure 6:
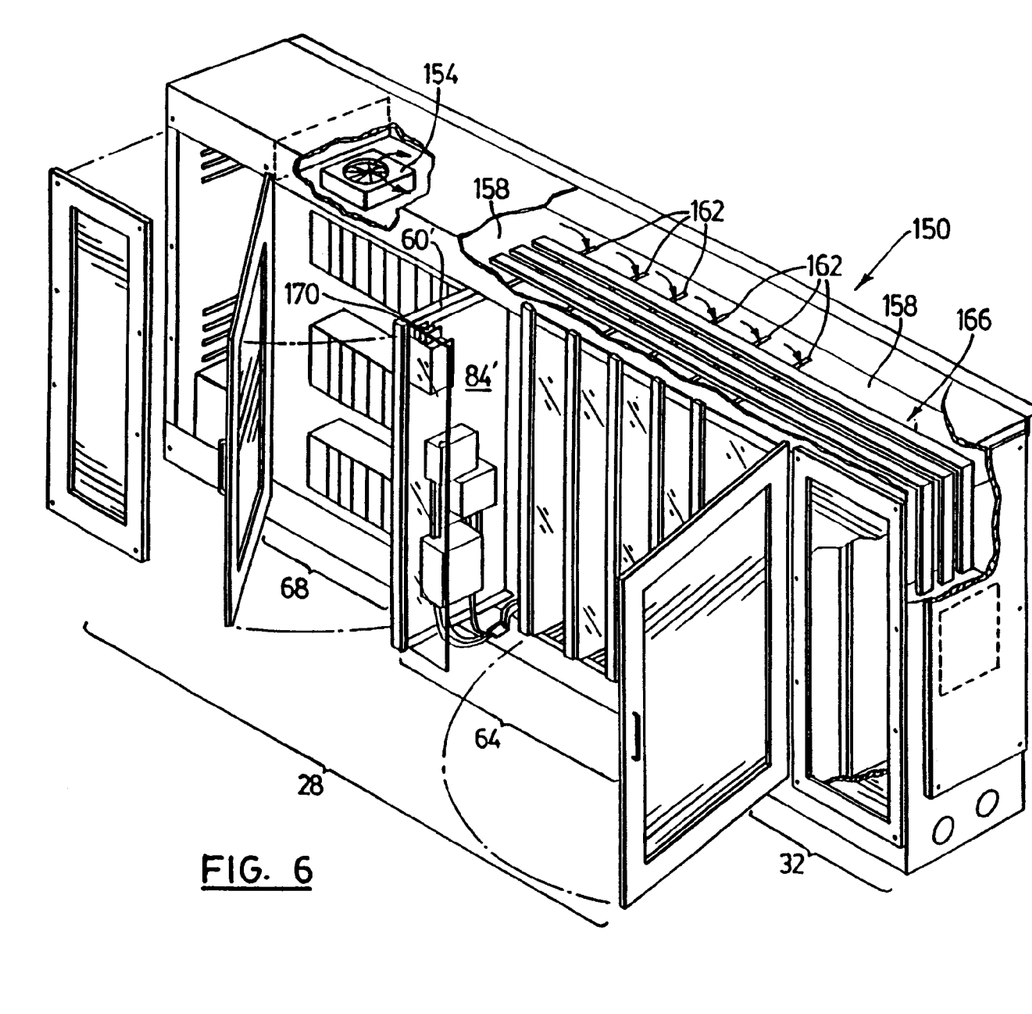
FIG. 6 shows a perspective view of the front and top of a power electrical enclosure in accordance with another embodiment of the present invention.

FIG. 6 shows another embodiment of the present invention wherein like components to those shown in FIGS. 2 through 5 are indicated by like reference numbers. This enclosure, which is indicated generally at 150, differs from that shown in FIGS. 2 and 3 as described below.

Instead of pancake fans 116 and 120, fan 154 has been provided in a plenum 158 which runs along the top of center section 28. Fan 154 draws air from within volume 68 and forces it along plenum 158 where it exits from slots 162 into volume 64. Second, plates 60' have a planar rectangular surface 84' which is continuous, rather than the cross bar arrangement shown in FIG. 4. Electrical and power components are mounted to surface 84' in the same manner with plate 60 of FIG. 4. However, the continuous arrangement of surface 84' serves both as a larger heat sink for the components mounted thereto and as an airflow barrier to direct airflow from slots 162 over the components mounted to surface 84' and to the bottom of volume 64 where it is drawn back to volume 68 by fan 154.

As is also illustrated in FIG. 6, instead of power cables 74, plenum 158 has a set of electrical bus bars 166 running along its length and into third portion 32 to supply power from a mains connection to plates 60'. Specifically, each plate 60' includes a connector 170 which when inserted correctly into enclosure 150, engages a complementary connector (not shown) which is located below plenum 158 and which is electrically connected to bus bars 166. Components requiring connections to electrical power are connected to connector 170 and receive the required power from bus bars 166 via connector 170 and the complementary connector. In this manner, a "quick connect" facility is provided for making power connections between plates 60', and components mounted thereon, and the mains supply. It is also contemplated that for configurations of components requiring larger amounts of power, two or more sets of bus bars 166 can be provided in plenum 158.

A suitable connector and complementary connector which is presently employed in enclosure 150 comprise part numbers 109723 and 109719, as sold by NATUS Gmbh and Company, KB, Loebstrasse #12, D-54292, Trier, Germany, although any other suitable connectors can be employed as will occur to those of skill in the art.

Figure 7:
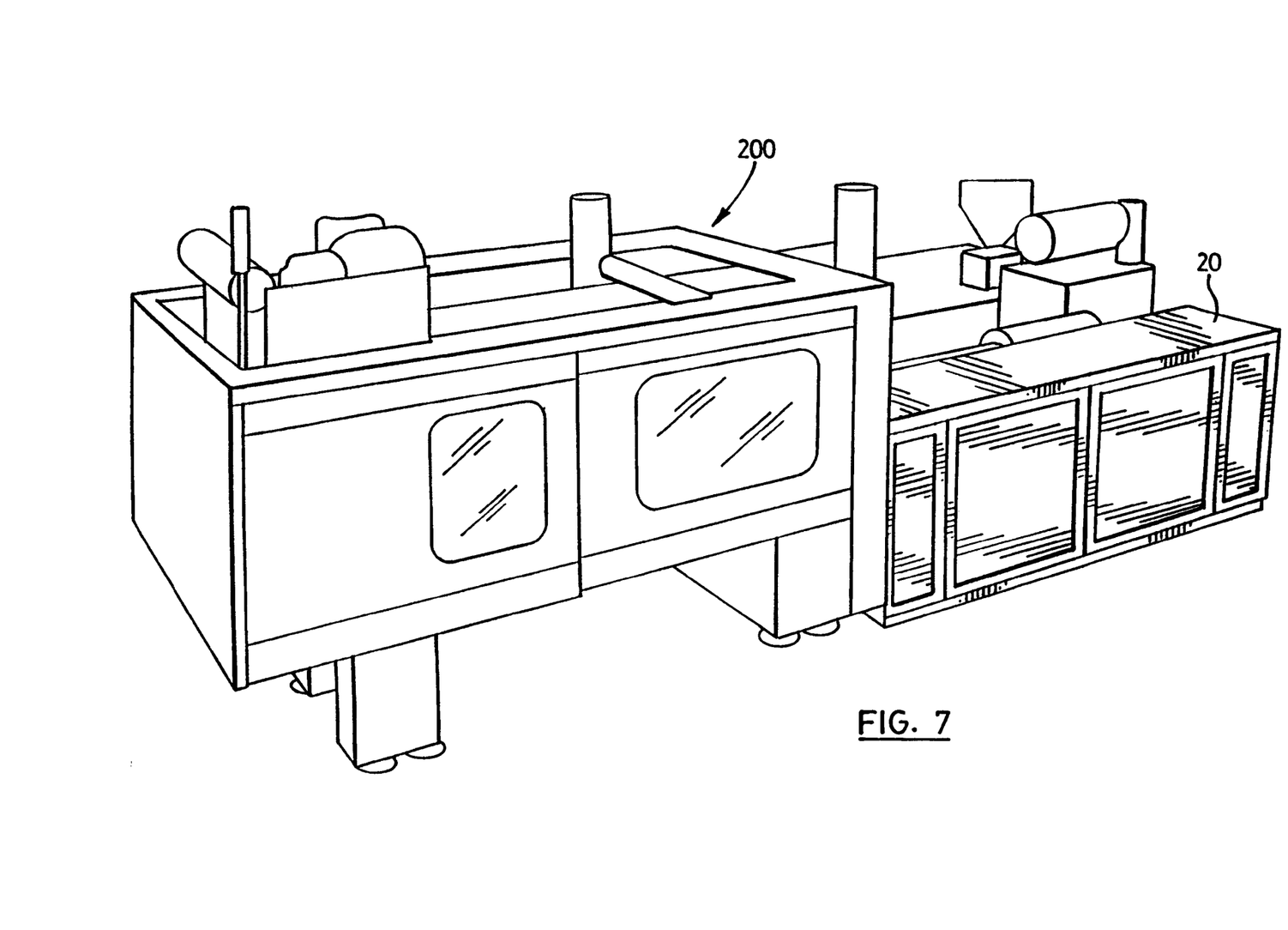
FIG. 7 shows an injection molding machine in accordance with the present invention.

Enclosures 20 and 150 are believed to be particularly suitable for use with industrial manufacturing machinery. In particular, FIG. 7 shows an injection molding machine 200 with its power electrical components, connections and low power control electronics in enclosure 20. In a typical large injection molding machine, such as a 825 ton Moduline™ machine manufactured by the assignee of the present invention, the machine can require a transformer, multiple power supplies for various components, a PLC, electromechanical hydraulic controls and related control circuitry, circuit breakers and interrupters, machine heaters, mold heaters (for a hot runner type machine), robotic and handling systems, a large hydraulic pump motor (100 HP or more) and mains disconnects.

In the above-mentioned Moduline™ machines, major functional systems such as the injection unit, mold clamp, hydraulics, controls and/or robotics systems are available as pre-engineered modules of different capacities and/or sizes, which are then assembled as necessary to meet a customer's specific needs. Accordingly, the specific power electric and electronics requirements of machine 200 are often not known until machine 200 is assembled to meet a specific customer order and the power and electrical subsystems are assembled at that time, in a very labour intensive manner.

In contrast, it is contemplated that with the present invention a plate 60 or 60' for each specific electrical power/electronics control function can be pre-manufactured and placed in enclosure 20 or 150 as required for a specific machine 200. For example a mold heat plate 60 can be pre-manufactured and used when machine 200 is matched with a hot runner type mold. If machine 200 is used with a cold runner type machine, then the mold heat plate can be omitted. Further, plates 60 can be pre-manufactured in different power capacities and/or configurations, for example to accommodate hydraulic pumps of different horsepower. It is also contemplated that a single power supply plate can be pre-manufactured which can provide necessary supply voltages to many components within enclosure 20 or 150, thus reducing the number of separate components within enclosure 20.

As will be apparent, in such a case once a machine 200 is specified, appropriate pre-manufactured plates 60 or 60' can be selected and assembled with any other necessary components in enclosure 20 or 150 in a relatively cost and time effective manner. Further, as will also be apparent, servicing and/or trouble shooting a machine 200 is simplified as plates 60 or 60', and hence corresponding functional subsystems, can be relatively easily changed.

As will be further apparent, the present invention can provide a high density enclosure for mounting, interconnecting and providing power and data to a plurality of control modules such as PLCs, circuit breakers, and hydraulic pump motors. The enclosure accommodates modular, pre-engineered machine function components, which can be independently pre-assembled and interchanged in a short period of time.

The present invention has the further advantage that standardized, modular power units, and other machine function components, can be tested outside the enclosure before they are mounted.

The standardized and modular nature of the components can also result in a simpler and less costly design, as well as increased ease and speed of assembly and disassembly. Repair of components, or upgrade of control functions, such as PLC's, can also be simplified since fall shutdown of the machine and rewiring of the components may not be necessary. In addition, by reducing the time that a molding machine is inactive, during upgrade or repair, the injection molding unit may not require purging when the machine is reactivated. This may be particularly important for high volume, precision molding applications such as the molding of information carrier plastic substrates, like compact discs or digital video discs.

The above-described embodiments of the invention are intended to be examples of the present invention and alterations and modifications may be effected thereto, by those of skill in the art, without departing from the scope of the invention which is defined solely by the claims appended hereto.

I claim:

1. An enclosure for power electrical components and connections, comprising:

a generally parallelpiped enclosure having a front face, a back face, a top and a bottom;

at least one cover on said enclosure to allow access to a volume defined therein;

at least one substantially planar plate—slidably inserted—into said enclosure, said plate extending—substantially vertical and substantially perpendicular—from said front face to said back face and having a surface mounting at least one—heat generating—power electrical component;

a cable raceway adjacent each of said top and bottom, one said cable raceway holding one of a set of—relatively large diameter—power cables and the other of said raceways holding a set of control and signal cables—for the reduction of electrical noise transmitted between said power cables and said control and signal cables—; and     a portion of said enclosure adjacent said at least one substantially planar plate having an exposed portion of a wall of said enclosure on which electrical components can be mounted.

2. An enclosure according to claim 1 further comprising a portion substantially isolated from the remainder of the interior volume of said enclosure, said portion including means to permit an exchange of air between the interior of said portion and the exterior of said enclosure.

3. An enclosure according to claim 1 wherein said at least one substantially planar plate includes a heat sink thermally connected to at least one power electrical component, said enclosure including an aperture through which said heat sink extends outside said enclosure when said plate is inserted into said enclosure.

4. An enclosure according to claim 3 further comprising means to circulate air within said interior of said enclosure without external venting of air.

5. An enclosure according to claim 4 wherein said means to circulate air includes a plenum extending along said enclosure and a fan for moving air from said interior volume into said plenum, said plenum having discharge slots for discharging air from said plenum along at least one said plate.

6. An enclosure for power electrical components and connections, comprising:

a generally parallelpiped enclosure having a front face, a back face, a top and a bottom;

at least one cover on said enclosure to allow access to a volume defined therein;

a cable raceway within said enclosure adjacent one of said top and bottom, said cable raceway holding only control and signal cables and an air plenum within said enclosure adjacent the other of said top and bottom, said air plenum operating to circulate cooling air within said enclosure and having at least one set of power bus bars enclosed therein;

at least one substantially planar plate—slidably inserted—into said enclosure, said plate extending—substantially vertical and substantially perpendicular—from said front face to said back face and having a surface mounting at least one—heat generating—power electrical component and a power connection means to receive power from said at least one set of power bus bars in said plenum and said cooling air circulated by said plenum being directed onto said mounting surface when said plate is inserted into said enclosure; and     a portion of said enclosure adjacent said at least one substantially planar plate having an exposed portion of a wall of said enclosure on which electrical components can be mounted.

7. An enclosure according to claim 6 wherein each of said at least one substantially planar plate includes a power connector and said enclosure includes a complementary power connector in electrical connection with said power bus bars such that when said at least one power electrical component is electrically connected to said power connector and said plate is inserted in said enclosure, said at least one power electrical component is electrically connect to said power bus bars.

\* \* \* \* \*